United States Patent
Zhu

(10) Patent No.: US 11,505,211 B2
(45) Date of Patent: Nov. 22, 2022

(54) RELATIVE SPEED BASED SPEED PLANNING FOR BUFFER AREA

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 107 days.

(21) Appl. No.: 16/904,975

(22) Filed: Jun. 18, 2020

(65) Prior Publication Data
US 2021/0394791 A1    Dec. 23, 2021

(51) Int. Cl.
*B60W 60/00* (2020.01)

(52) U.S. Cl.
CPC .. *B60W 60/0016* (2020.02); *B60W 60/00276* (2020.02)

(58) Field of Classification Search
None
See application file for complete search history.

(56) References Cited

U.S. PATENT DOCUMENTS

| | | | |
|---|---|---|---|
| 6,496,108 B1 | 12/2002 | Bker et al. | |
| 11,161,502 B2* | 11/2021 | Caldwell | B60W 60/0011 |
| 2006/0217866 A1 | 9/2006 | Moebus | |
| 2013/0116861 A1 | 5/2013 | Nemoto | |
| 2015/0142207 A1 | 5/2015 | Flehmig et al. | |
| 2019/0080266 A1* | 3/2019 | Zhu | G01C 21/3453 |
| 2020/0377085 A1* | 12/2020 | Floyd-Jones | B60W 60/00276 |
| 2021/0094539 A1* | 4/2021 | Beller | B60Q 1/50 |

* cited by examiner

*Primary Examiner* — James J Lee
*Assistant Examiner* — Andrew Sang Kim
(74) *Attorney, Agent, or Firm* — Womble Bond Dickinson (US) LLP

(57) ABSTRACT

In one embodiment, a method, apparatus, and system for planning the trajectory of an autonomous driving vehicle (ADV) in view of an object within a buffer area in front of the ADV is disclosed. A buffer area in front of an ADV is identified. A first object of one or more objects that have entered the buffer area is identified. A first distance cost and a first relative speed cost associated with the first object are determined. A first object cost associated with the first object is determined based on a combination of the first distance cost and the first relative speed cost. A trajectory for the ADV is planned based at least in part on a cost function comprising the first object cost, where the cost function is minimized in the planning. Control signals are generated to drive the ADV based on the planned trajectory.

18 Claims, 12 Drawing Sheets

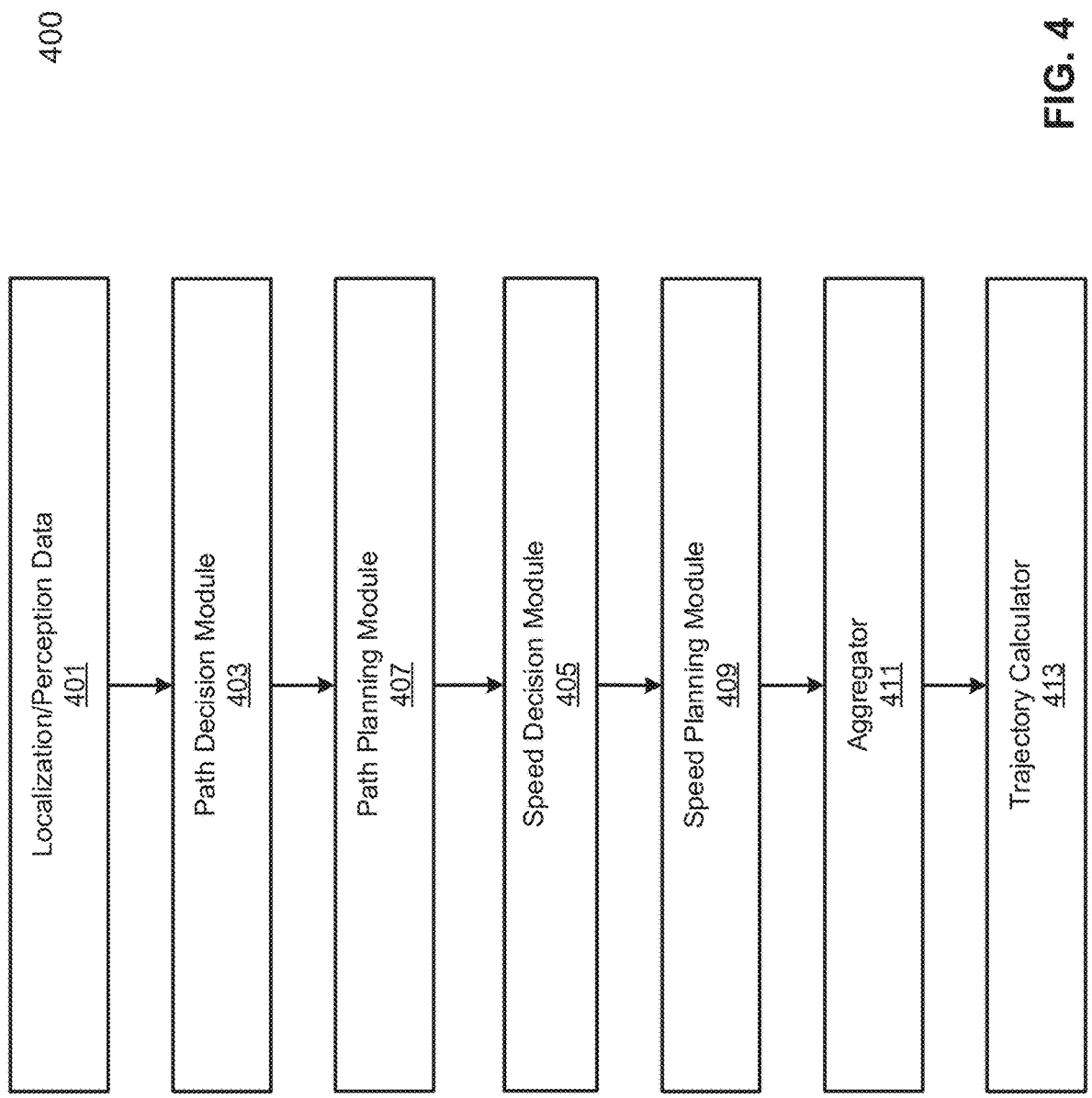

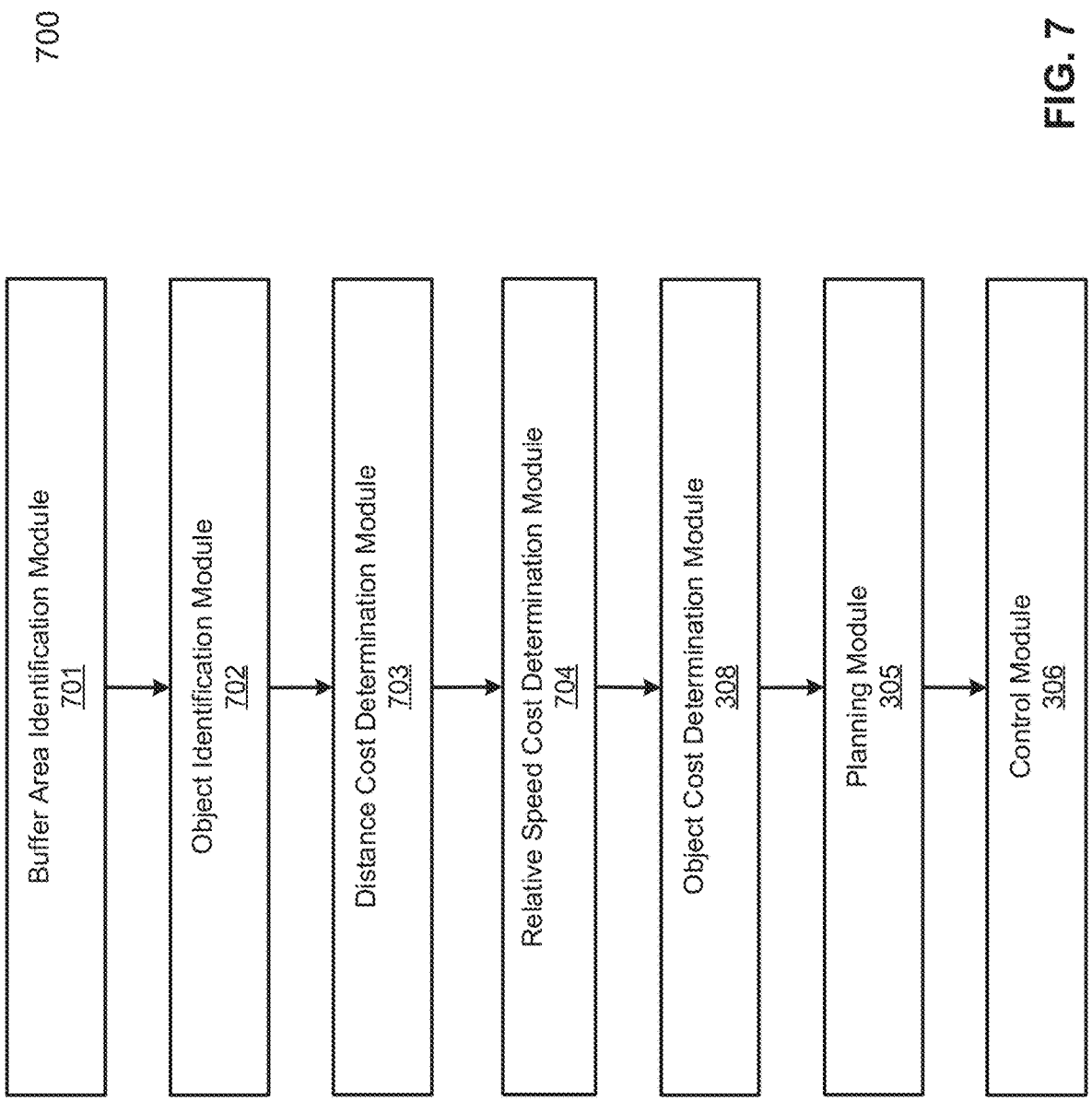

RELATIVE SPEED BASED SPEED PLANNING FOR BUFFER AREA

TECHNICAL FIELD

Embodiments of the present disclosure relate generally to operating autonomous driving vehicles. More particularly, embodiments of the disclosure relate to planning a trajectory for an autonomous driving vehicle in view of an object within a buffer area in front of the vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Conventionally, hard buffer areas surrounding an autonomous driving vehicle (ADV) are established to keep safe distances. During planning, the hard buffer areas are treated the same as the body of the ADV, and create hard boundaries. A hard buffer area immediately in front of the ADV may have the same width as the ADV, and may be 1-3 meters long. When an object enters a hard buffer area in front of the ADV, a command signal for braking the ADV at the maximum brake force is generated. Such a harsh brake causes discomfort to passengers of the ADV, but may not always be necessary.

BRIEF DESCRIPTION OF THE DRAWINGS

Embodiments of the disclosure are illustrated by way of example and not limitation in the figures of the accompanying drawings in which like references indicate similar elements.

FIG. 4 is a block diagram illustrating an example of a decision and planning system according to one embodiment.

FIG. 7 is a block diagram illustrating various example modules usable for planning the trajectory of an autonomous driving vehicle (ADV) in view of an object within a buffer area in front of the ADV according to one embodiment.

DETAILED DESCRIPTION

Figure 1:
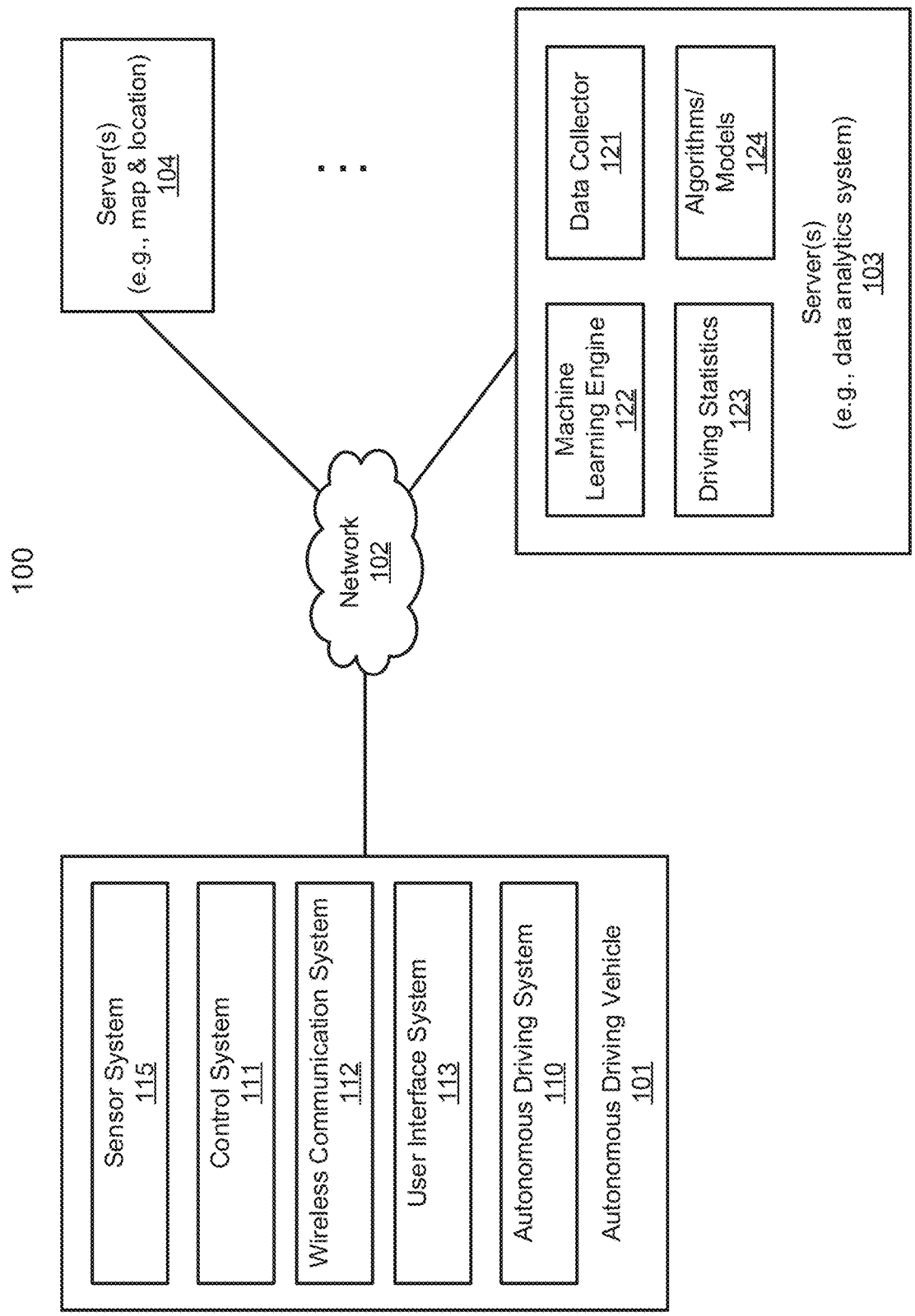
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a method, apparatus, and system for planning the trajectory of an autonomous driving vehicle (ADV) in view of an object within a (soft) buffer area in front of the ADV is disclosed. A buffer area in front of an ADV is identified. A first object of one or more objects that have entered the buffer area is identified. A first distance cost is determined based on a first distance between the first object and the ADV. A first relative speed cost is determined based on a first relative speed between the first object and the ADV. A first object cost associated with the first object is determined based on a combination of the first distance cost and the first relative speed cost. A trajectory for the ADV is planned based at least in part on a cost function comprising the first object cost, where the cost function is minimized in the planning. Control signals are generated to drive the ADV based on the planned trajectory.

In one embodiment, the buffer area is in front of the ADV, has a rectangular horizontal section, and shares a same width with the ADV. In one embodiment, the buffer area is flush with the ADV widthwise. In one embodiment, the first distance cost is determined based on a first function that is based on a reciprocal function. In one embodiment, the first relative speed cost is determined based on a second function. According to the second function, a relative speed cost is equal to a first positive constant when a projected relative speed is below a first threshold, decreases as the projected relative speed increases when the relative speed is above the first threshold and below a second threshold, and is equal to zero when the projected relative speed is above the second threshold.

In one embodiment, the first object cost is equal to a product of the first distance cost and the first relative speed cost. In one embodiment, a second object of the one or more objects that have entered the buffer area is identified. A second distance cost is determined based on a second distance between the second object and the ADV. A second relative speed cost is determined based on a second relative speed between the second object and the ADV. A second object cost associated with the second object based on a combination of the second distance cost and the second relative speed cost. The cost function that is minimized during the planning process further comprises the second object cost.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
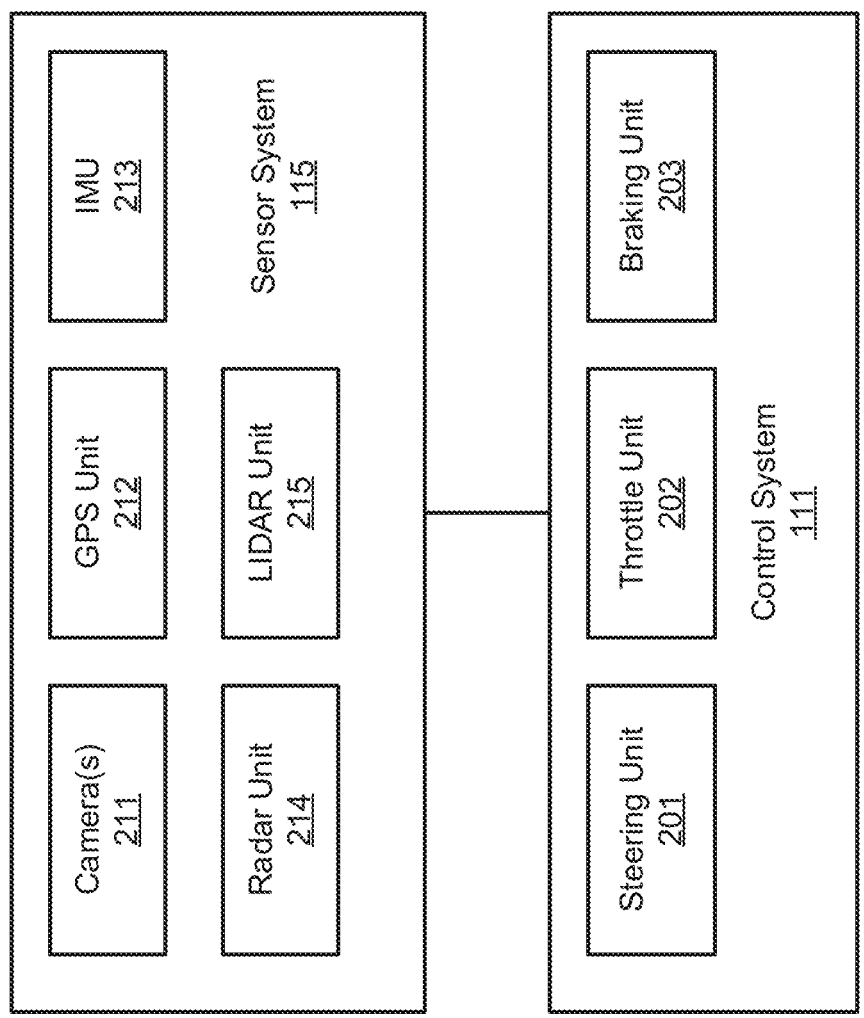
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an algorithm for planning the trajectory of an ADV in view of an object within a buffer area in front of the ADV, as well as speed planning on the trajectory based on a relative speed cost and a distance cost using a set of predetermined cost functions. Algorithms 124 can then be uploaded on ADVs to be utilized during autonomous driving in real-time.

Figure 3A:
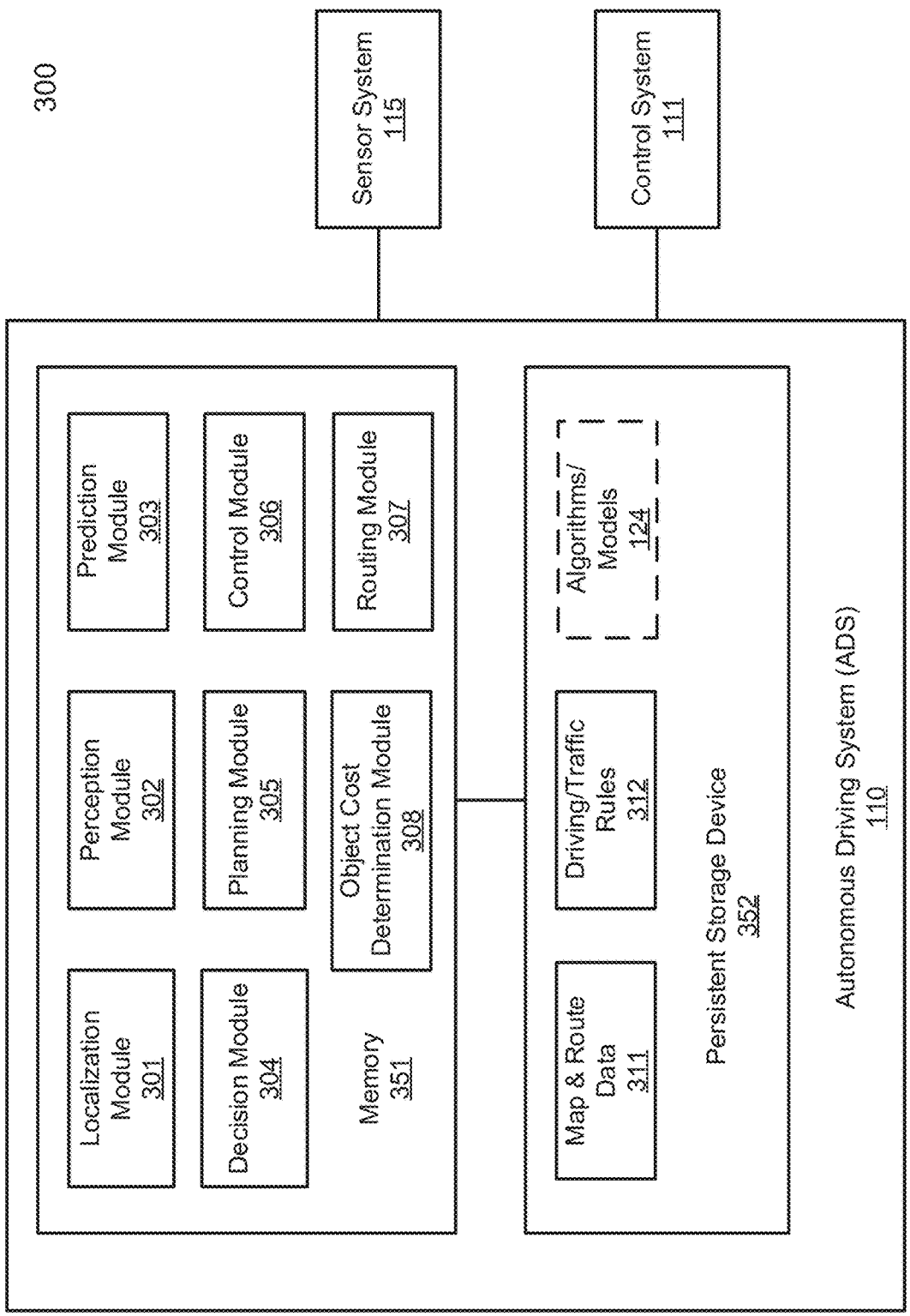
FIGS. 3A-3B are block diagrams illustrating an example of an autonomous driving system used with an autonomous driving vehicle according to one embodiment.
Figure 3B:
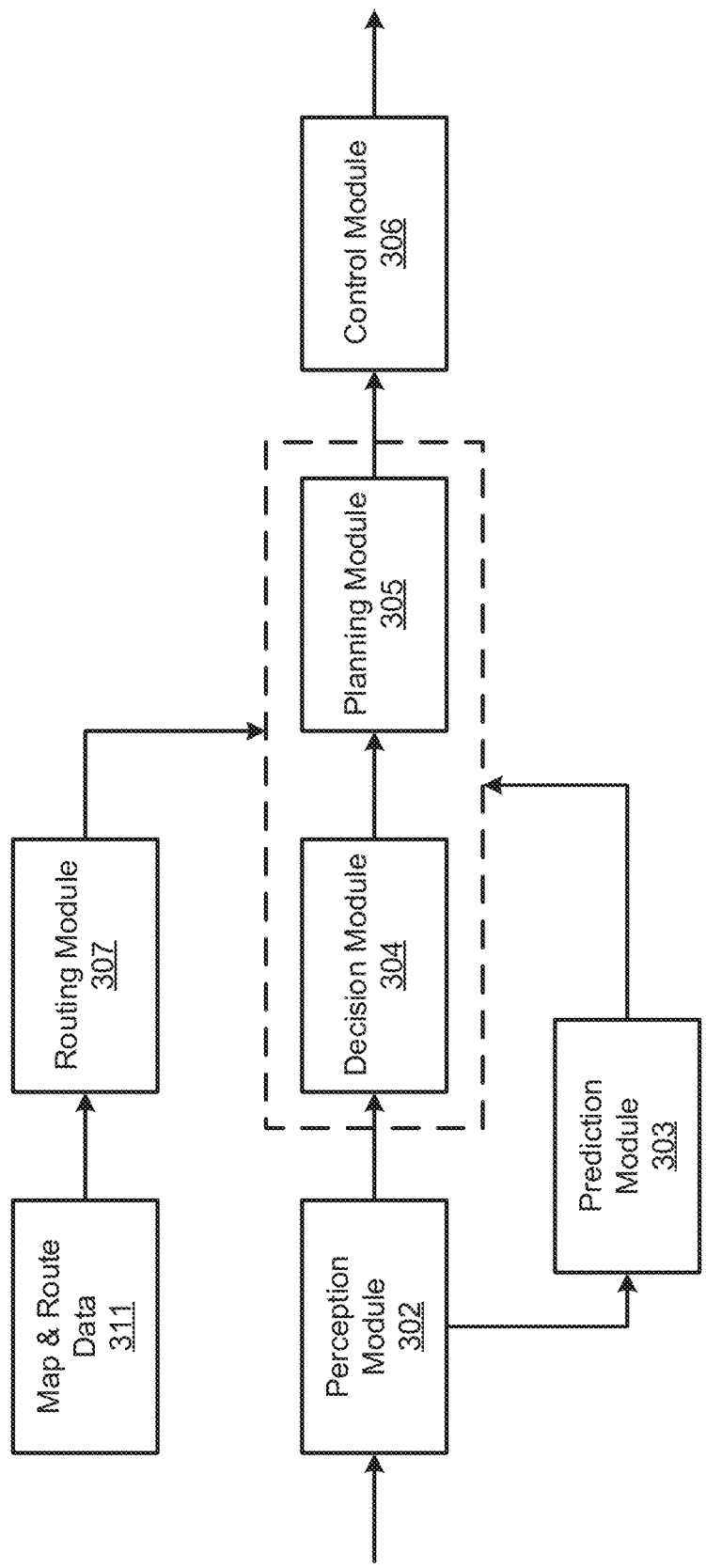

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307, object cost determination module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module. For example, object cost determination module 308 may be implemented as a part of planning module 305.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

FIG. 4 is a block diagram illustrating an example of a decision and planning system according to one embodiment. System 400 may be implemented as part of autonomous driving system 300 of FIGS. 3A-3B to perform path planning and speed planning operations. Referring to FIG. 4, Decision and planning system 400 (also referred to as a planning and control or PnC system or module) includes, amongst others, routing module 307, localization/perception data 401, path decision module 403, speed decision module 405, path planning module 407, speed planning module 409, aggregator 411, and trajectory calculator 413.

Path decision module 403 and speed decision module 405 may be implemented as part of decision module 304. In one embodiment, path decision module 403 may include a path state machine, one or more path traffic rules, and a station-lateral maps generator. Path decision module 403 can generate a rough path profile as an initial constraint for the path/speed planning modules 407 and 409 using dynamic programming.

In one embodiment, the path state machine includes at least three states: a cruising state, a changing lane state, and/or an idle state. The path state machine provides previous planning results and important information such as whether the ADV is cruising or changing lanes. The path traffic rules, which may be part of driving/traffic rules 312 of FIG. 3A, include traffic rules that can affect the outcome of a path decisions module. For example, the path traffic rules can include traffic information such as construction traffic signs nearby the ADV can avoid lanes with such construction signs. From the states, traffic rules, reference line provided by routing module 307, and obstacles perceived by perception module 302 of the ADV, path decision module 403 can decide how the perceived obstacles are handled (i.e., ignore, overtake, yield, stop, pass), as part of a rough path profile.

For example, in one embedment, the rough path profile is generated by a cost function consisting of costs based on: a curvature of path and a distance from the reference line and/or reference points to obstacles. Points on the reference line are selected and are moved to the left or right of the reference lines as candidate movements representing path candidates. Each of the candidate movements has an associated cost. The associated costs for candidate movements of one or more points on the reference line can be solved using dynamic programming for an optimal cost sequentially, one point at a time.

In one embodiment, a state-lateral (SL) maps generator (not shown) generates an SL map as part of the rough path profile. An SL map is a two-dimensional geometric map (similar to an x-y coordinate plane) that includes obstacles information perceived by the ADV. From the SL map, path decision module 403 can lay out an ADV path that follows the obstacle decisions. Dynamic programming (also referred to as a dynamic optimization) is a mathematical optimization method that breaks down a problem to be solved into a sequence of value functions, solving each of these value functions just once and storing their solutions. The next time the same value function occurs, the previous computed solution is simply looked up saving computation time instead of recomputing its solution.

Speed decision module 405 or the speed decision module includes a speed state machine, speed traffic rules, and a station-time graphs generator (not shown). Speed decision process 405 or the speed decision module can generate a rough speed profile as an initial constraint for the path/speed planning modules 407 and 409 using dynamic programming. In one embodiment, the speed state machine includes at least two states: a speed-up state and/or a slow-down state. The speed traffic rules, which may be part of driving/traffic rules 312 of FIG. 3A, include traffic rules that can affect the outcome of a speed decisions module. For example, the speed traffic rules can include traffic information such as red/green traffic lights, another vehicle in a crossing route, etc. From a state of the speed state machine, speed traffic rules, rough path profile/SL map generated by decision module 403, and perceived obstacles, speed decision module 405 can generate a rough speed profile to control when to speed up and/or slow down the ADV. The SL graphs generator can generate a station-time (ST) graph as part of the rough speed profile.

In one embodiment, path planning module 407 includes one or more SL maps, a geometry smoother, and a path costs module (not shown). The SL maps can include the station-lateral maps generated by the SL maps generator of path decision module 403. Path planning module 407 can use a rough path profile (e.g., a station-lateral map) as the initial constraint to recalculate an optimal reference line using quadratic programming. Quadratic programming (QP) involves minimizing or maximizing an objective function (e.g., a quadratic function with several variables) subject to bounds, linear equality, and inequality constraints.

One difference between dynamic programming and quadratic programming is that quadratic programming optimizes all candidate movements for all points on the reference line at once. The geometry smoother can apply a smoothing algorithm (such as B-spline or regression) to the output station-lateral map. The path costs module can recalculate a reference line with a path cost function, to optimize a total cost for candidate movements for reference points, for example, using QP optimization performed by a QP module (not shown). For example, in one embodiment, a total path cost function can be defined as follows:

$$\text{path cost} = \Sigma_{points}(\text{heading})^2 + \Sigma_{points}(\text{curvature})^2 \Sigma_{points}(\text{distance})^2,$$

where the path costs are summed over all points on the reference line, heading denotes a difference in radial angles (e.g., directions) between the point with respect to the reference line, curvature denotes a difference between curvature of a curve formed by these points with respect to the reference line for that point, and distance denotes a lateral (perpendicular to the direction of the reference line) distance from the point to the reference line. In some embodiments, distance represents the distance from the point to a destination location or an intermediate point of the reference line. In another embodiment, the curvature cost is a change between curvature values of the curve formed at adjacent points. Note the points on the reference line can be selected as points with equal distances from adjacent points. Based on the path cost, the path costs module can recalculate a reference line by minimizing the path cost using quadratic programming optimization, for example, by the QP module.

Speed planning module 409 includes station-time graphs, a sequence smoother, and a speed costs module. The station-time graphs can include a ST graph generated by the ST graphs generator of speed decision module 405. Speed planning module 409 can use a rough speed profile (e.g., a station-time graph) and results from path planning module 407 as initial constraints to calculate an optimal station-time curve. The sequence smoother can apply a smoothing algorithm (such as B-spline or regression) to the time sequence of points. The speed costs module can recalculate the ST graph with a speed cost function to optimize a total cost for movement candidates (e.g., speed up/slow down) at different points in time.

For example, in one embodiment, a total speed cost function can be:

$$\text{speed cost} = \Sigma_{points}(\text{speed'})^2 + \Sigma_{points}(\text{speed''})^2 + (\text{distance})^2,$$

where the speed costs are summed over all time progression points, speed' denotes an acceleration value or a cost to change speed between two adjacent points, speed'' denotes a jerk value, or a derivative of the acceleration value or a cost to change the acceleration between two adjacent points, and distance denotes a distance from the ST point to the destination location. Here, the speed costs module calculates a station-time graph by minimizing the speed cost using quadratic programming optimization, for example, by the QP module.

Aggregator 411 performs the function of aggregating the path and speed planning results. For example, in one embodiment, aggregator 411 can combine the two-dimensional ST graph and SL map into a three-dimensional SLT graph. In another embodiment, aggregator 411 can interpolate (or fill in additional points) based on two consecutive points on an SL reference line or ST curve. In another embodiment, aggregator 411 can translate reference points from (S, L) coordinates to (x, y) coordinates. Trajectory generator 413 can calculate the final trajectory to control ADV 510. For example, based on the SLT graph provided by aggregator 411, trajectory generator 413 calculates a list of (x, y, T) points indicating at what time should the ADC pass a particular (x, y) coordinate.

Thus, path decision module 403 and speed decision module 405 are configured to generate a rough path profile and a rough speed profile taking into consideration obstacles and/or traffic conditions. Given all the path and speed decisions regarding the obstacles, path planning module 407 and speed planning module 409 are to optimize the rough path profile and the rough speed profile in view of the obstacles using QP programming to generate an optimal trajectory with minimum path cost and/or speed cost.

Figure 5:
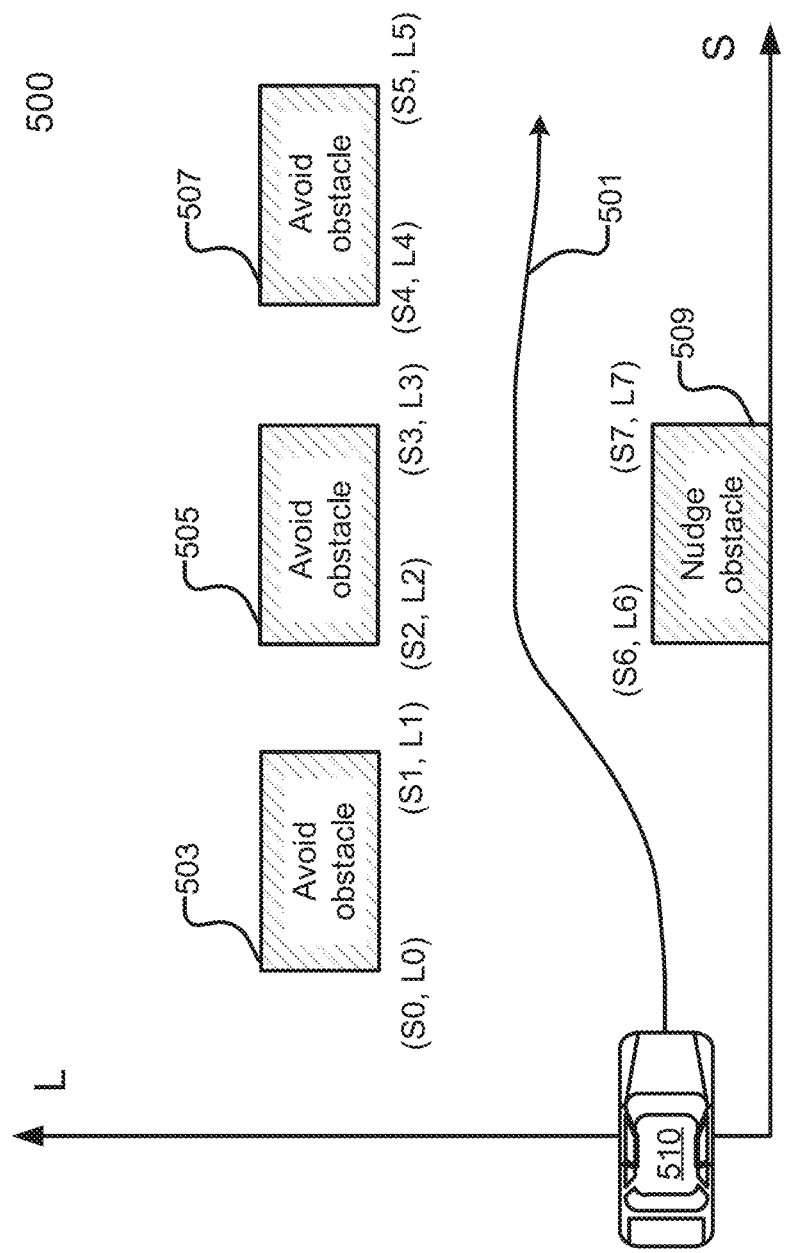
FIG. 5 is a block diagram illustrating a station-lateral map according to one embodiment

FIG. 5 is a block diagram illustrating a station-lateral map according to one embodiment. Referring to FIG. 5, SL map 500 has an S horizontal axis, or station, and an L vertical axis, or lateral. As described above, station-lateral coordinates are a relative geometric coordinate system that references a particular stationary point on a reference line and follows the reference line. For example, a (S, L)=(1, 0) coordinate can denote one meter ahead of a stationary point (i.e., a reference point) on the reference line with zero meter lateral offset. A (S, L)=(2, 1) reference point can denote two meters ahead of the stationary reference point along the reference line and an one meter perpendicular lateral offset from the reference line, e.g., a left offset.

Referring to FIG. 5, SL map 500 includes reference line 501 and obstacles 503-509 perceived by ADV 510. In one embodiment, obstacles 503-509 may be perceived by a RADAR or LIDAR unit of ADV 510 in a different coordinate system and translated to the SL coordinate system. In another embodiment, obstacles 503-509 may be artificially formed barriers as constraints so the decision and planning modules would not search in the constrained geometric spaces. In this example, a path decision module can generate decisions for each of obstacles 503-509 such as decisions to avoid obstacles 503-508 and nudge (approach very closely) obstacle 509 (i.e., these obstacles may be other cars, buildings and/or structures). A path planning module can then recalculate or optimize reference line 501 based on a path cost in view of obstacles 503-509 using QP programming to fine tune reference line 501 with the minimum overall cost as described above. In this example, the ADV nudges, or approaches very close, for obstacle 509 from the left of obstacle 509.

Figure 6A:
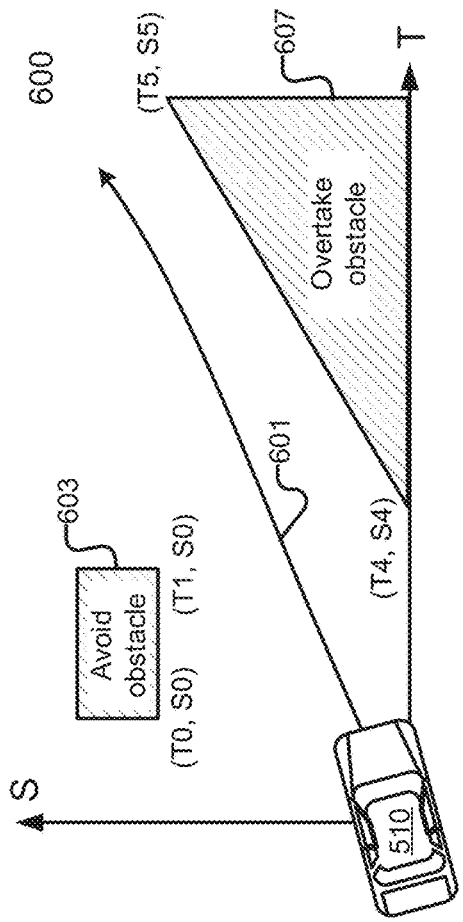
FIGS. 6A-B are block diagrams illustrating station-time maps according to some embodiments.
Figure 6B:
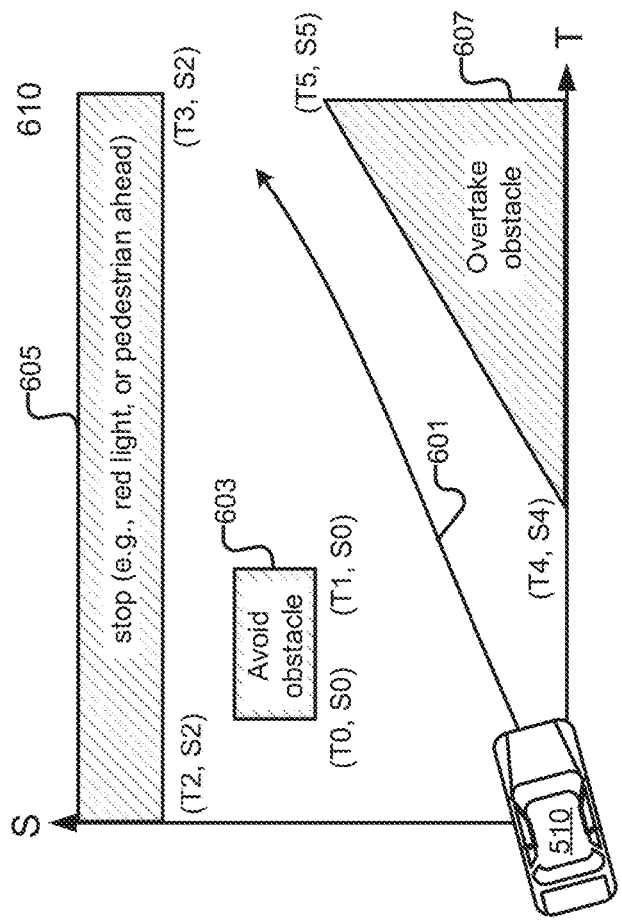

FIGS. 6A and 6B are block diagrams illustrating station-time maps according to some embodiments. Referring to FIG. 6A, ST graph 600 has a station (or S) vertical axis and a time (or T) horizontal axis. ST graph 600 includes curve 601 and obstacles 603-607. As described above, curve 601 on station-time graph indicates, at what time and how far away is the ADV from a station point. For example, a (T, S)=(10000, 150) can denote in 10000 milliseconds, an ADV would be 150 meters from the stationary point (i.e., a reference point). In this example, obstacle 603 may be a building/structure to be avoided and obstacle 607 may be an artificial barrier corresponding to a decision to overtake a moving vehicle.

Referring to FIG. 6B, in this scenario, artificial barrier 605 is added to the ST graph 610 as a constraint. The artificial barrier can be examples of a red light or a pedestrian in the pathway that is at a distance approximately S2 from the station reference point, as perceived by the ADV. Barrier 705 corresponds to a decision to "stop" the ADV until the artificial barrier is removed at a later time (i.e., the traffic light changes from red to green, or a pedestrian is no longer in the pathway).

Referring to FIG. 7, a block diagram 700 illustrating various example modules usable for planning the trajectory of an autonomous driving vehicle (ADV) in view of an object within a buffer area in front of the ADV according to one embodiment is shown. Each of the various modules may be implemented in hardware, software, or a combination thereof. At buffer area identification module 701, a buffer area in front of an ADV is identified. At object identification module 702, a first object of one or more objects that have entered the buffer area is identified. At distance cost determination module 703, a first distance cost is determined based on a first distance between the first object and the ADV. At relative speed cost determination module 704, a first relative speed cost is determined based on a first relative speed between the first object and the ADV. At object cost determination module 308, a first object cost associated with the first object is determined based on a combination of the first distance cost and the first relative speed cost. At planning module 305, a trajectory for the ADV is planned based at least in part on a cost function (e.g., the overall cost described above) comprising the first object cost, where the cost function is minimized in the planning. At control module 306, control signals are generated to drive the ADV based on the planned trajectory. Note that some or all of the modules as shown may be integrated into fewer number of modules or a single module.

Figure 8:
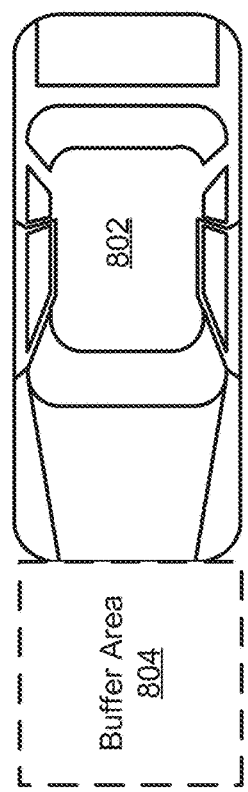
FIG. 8 is a diagram illustrating an example ADV with a soft front buffer area according to one embodiment.

Referring to FIG. 8, a diagram 800 illustrating an example ADV with a soft front buffer area according to one embodiment is shown. The buffer area 804 is immediately in front of the ADV 802. In one embodiment, the buffer area 802 has a rectangular horizontal section, and shares a same width with the ADV 802. In one embodiment, the length of the buffer area 802 may be approximately 3 meters (m). In one embodiment, the buffer area 802 is flush with the ADV 804 widthwise.

Figure 9A:
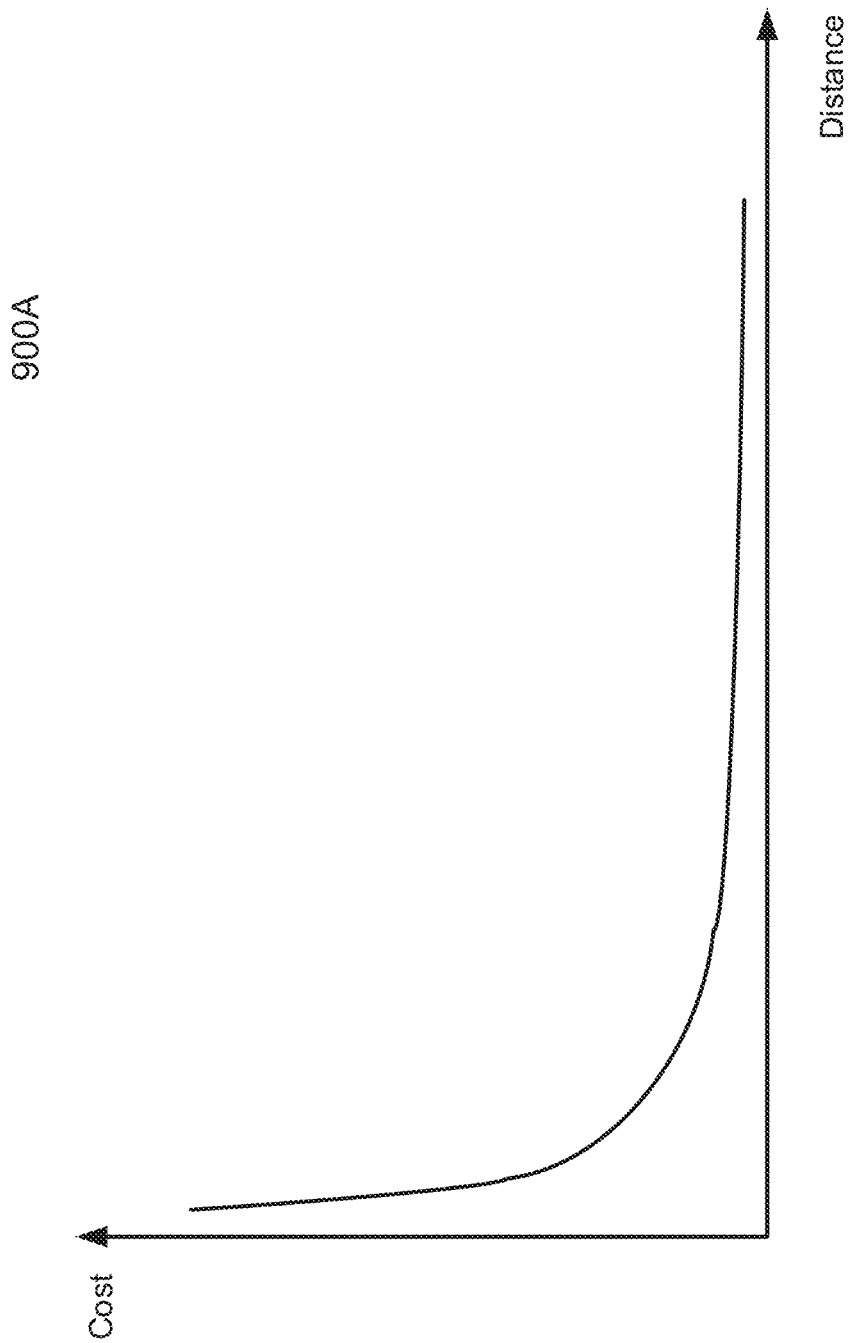
FIG. 9A is a diagram illustrating a plot of an example first function that maps a distance to a distance cost implemented at the distance cost determination module according to one embodiment.

In one embodiment, the first distance cost is determined based on a function that is based on a reciprocal function. Referring to FIG. 9A, a diagram 900A illustrating a plot of an example first cost function that maps a distance to a distance cost implemented at the distance cost determination module according to one embodiment is shown. The function that maps a distance to a distance cost may be based on a reciprocal function. In one embodiment, the function that maps a distance to a distance cost may be of the form: distance cost=1/(0.5*distance). Therefore, it should be appreciated that the plot illustrated in FIG. 9A is one branch of a hyperbola: the distance cost approaches infinity as the distance approaches zero, and decreases precipitously as the distance increases. It should be appreciated that the body of the ADV is treated as a hard boundary as is conventionally done: the distance cost is equal to infinity when an object intersects with the body of the ADV, and in that case a braking command at the maximum brake force would be generated.

Figure 9B:
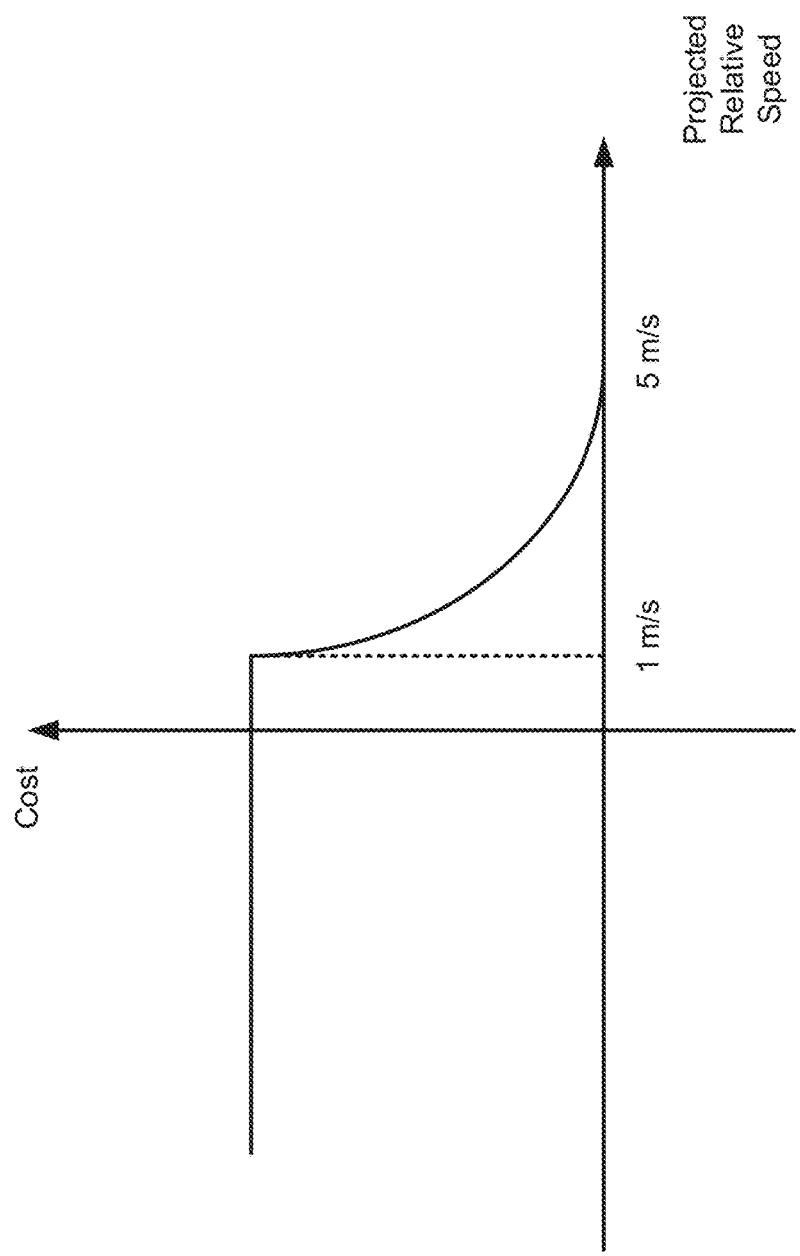
FIG. 9B is a diagram illustrating a plot of an example second function that maps a projected relative speed to a relative speed cost implemented at the relative speed cost determination module according to one embodiment.

In one embodiment, the first relative speed cost is determined based on a second cost function. Referring to FIG. 9B, a diagram 900B illustrating a plot of an example second function that maps a projected relative speed to a relative speed cost implemented at the relative speed cost determination module according to one embodiment is shown. The projected relative speed may be determined by projecting the relative speed between an object and the ADV to a direction of travel of the ADV. It should be appreciated that the projected relative speed is a signed variable—It is negative when the object is moving away from the ADV (i.e., the object is traveling forward in front of the ADV at a forward speed faster than that of the ADV), is zero when the object is stationary relative to the ADV in the direction of travel of the ADV, and is positive when the ADV is moving closer to the object (i.e., the object is 1) traveling forward in front of the ADV at a forward speed slower than that of the ADV, 2) stationary in the direction of travel of the ADV, or 3) traveling backward in front of the ADV toward the ADV).

According to the second cost function illustrated in FIG. 9B, the relative speed cost is equal to a first positive constant when the projected relative speed is below a first threshold (e.g., approximately 1 m/s) (i.e., when the projected relative speed is negative, zero, or positive still below the first threshold), decreases as the projected relative speed increases when the relative speed is above the first threshold (e.g., approximately 1 m/s) and below a second threshold (e.g., approximately 5 m/s), and is equal to zero when the relative speed is above the second threshold (e.g., approximately 5 m/s). The example first and second thresholds provided herein are for illustrative purposes only. Further, it should be appreciated that without deviating from the present disclosure, the projected relative speed may be defined in a different way (e.g., positive when the object is moving away from the ADV, and negative when the ADV is moving closer to the object), and the second function may be adapted accordingly.

An object cost associated with an object may be equal to a product of a respective distance cost associated with the object and a respective relative speed cost associated with the object (i.e., object cost=distance cost*relative speed cost). In one embodiment, the first object cost is equal to a product of the first distance cost and the first relative speed cost.

If more than one object has entered the buffer area, the object costs associated with the additional objects can be similarly determined. For example, in one embodiment, a second object of the one or more objects that have entered the buffer area is identified. A second distance cost is determined based on a second distance between the second object and the ADV. A second relative speed cost is determined based on a second relative speed between the second object and the ADV. A second object cost associated with the second object based on a combination of the second distance cost and the second relative speed cost. The cost function that is minimized during the planning process (e.g., the overall cost) further comprises the second object cost.

Figure 10:
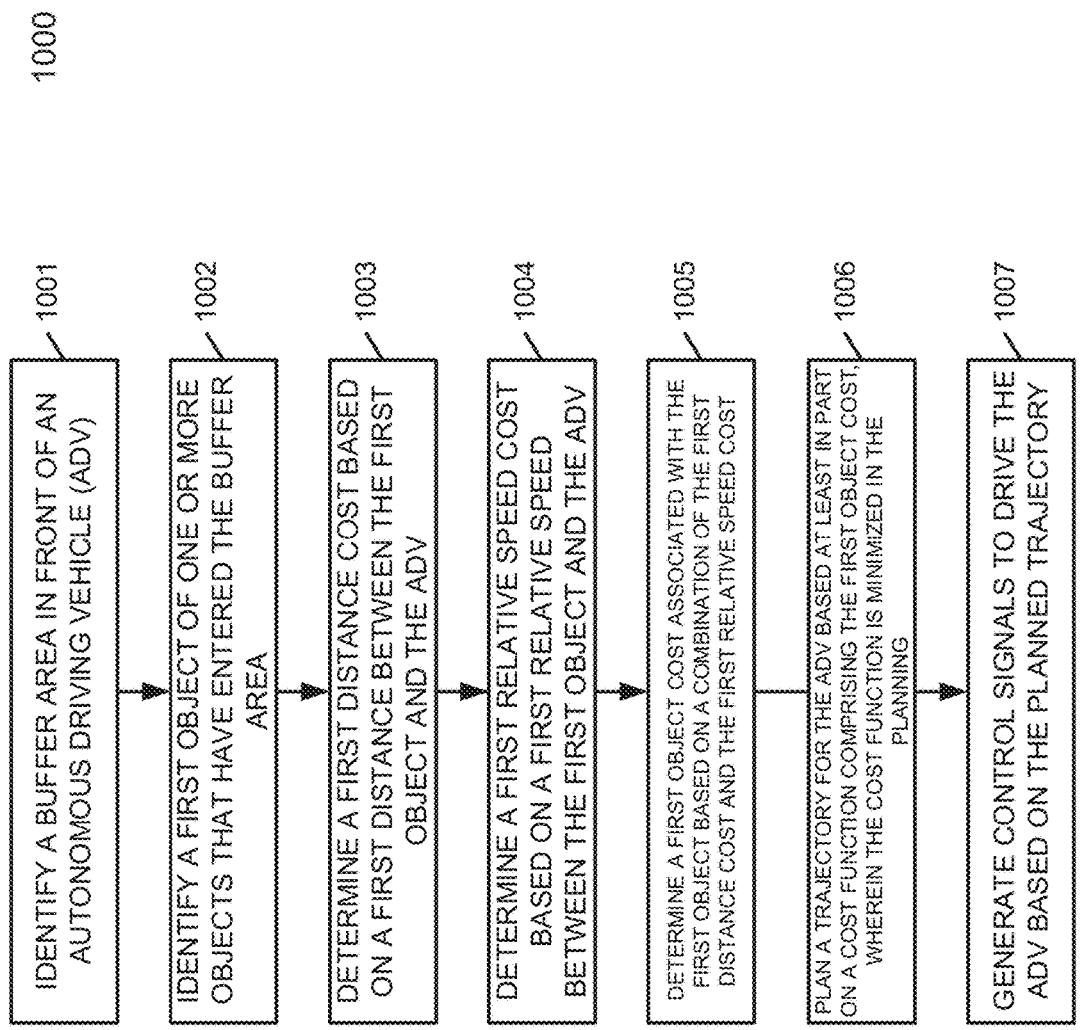
FIG. 10 is a flowchart illustrating an example method for planning the trajectory of an autonomous driving vehicle (ADV) in view of an object within a buffer area in front of the ADV according to one embodiment.

Referring to FIG. 10, a flowchart illustrating an example method 1000 for planning the trajectory of an autonomous driving vehicle (ADV) in view of an object within a buffer area in front of the ADV according to one embodiment is shown. The process 1000 may be implemented in hardware, software, or a combination thereof. At block 1001, a buffer area in front of an ADV is identified. At block 1002, a first object of one or more objects that have entered the buffer area is identified. At block 1003, a first distance cost is determined based on a first distance between the first object and the ADV. At block 1004, a first relative speed cost is determined based on a first relative speed between the first object and the ADV. At block 1005, a first object cost associated with the first object is determined based on a combination of the first distance cost and the first relative speed cost. At block 1006, a trajectory for the ADV is planned based at least in part on a cost function comprising the first object cost, where the cost function is minimized in the planning. At block 1007, control signals are generated to drive the ADV based on the planned trajectory.

Therefore, embodiments relate to planning the trajectory of an autonomous driving vehicle (ADV) in view of an object within a buffer area in front of the ADV, where a soft buffer area is utilized and object costs for objects that have entered the buffer area are determined. The object costs are included in a cost function that is minimized during the planning process. Accordingly, unnecessary harsh brakes that would result from using a hard buffer area could be avoided.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle, the method comprising:
identifying a first object of one or more objects that have entered a buffer area predefined relative to an autonomous driving vehicle (ADV), wherein the buffer area is immediately in front of the ADV has a rectangular horizontal section with a predetermined length and shares a same width with the ADV;

determining a first distance cost based on a first distance between the first object and the ADV;

determining a first relative speed cost based on a first relative speed between the first object and the ADV, wherein the first relative speed cost is determined based on a second cost function, and wherein according to the second cost function, a relative speed cost is equal to a first positive constant when a projected relative speed is below a first threshold, wherein the relative speed cost decreases as the projected relative speed increases when the projected relative speed is above the first threshold and below a second threshold, and is equal to zero when the projected relative speed is above the second threshold;

determining a first object cost associated with the first object based on a combination of the first distance cost and the first relative speed cost;

performing speed planning on a trajectory planned for the ADV based at least in part on the first distance cost and the first relative speed cost;

generating control signals to drive the ADV based on the planned trajectory; and driving the ADV based on the generated control signals.

2. The method of claim 1, wherein the first distance cost is determined based on a first cost function that is based on a reciprocal function.

3. The method of claim 2, wherein the first cost function maps a distance to a distance cost and is of the form: distance cost=1/(0.5* distance).

4. The method of claim 1, further comprising determining a first object cost associated with the first object based on a combination of the first distance cost and the first relative speed cost, wherein the speed planning is performed based on the first object cost.

5. The method of claim 4, wherein the first object cost is equal to a product of the first distance cost and the first relative speed cost.

6. The method of claim 1, wherein the projected relative speed is a signed variable, and wherein the projected relative speed is negative when the object is moving away from the ADV.

7. A non-transitory machine-readable medium having instructions stored therein, which when executed by a processor, cause the processor to perform operations, the operations comprising:

identifying a first object of one or more objects that have entered a buffer area predefined relative to an autonomous driving vehicle (ADV), wherein the buffer area is immediately in front of the ADV has a rectangular horizontal section with a predetermined length and shares a same width with the ADV;

determining a first distance cost based on a first distance between the first object and the ADV;

determining a first relative speed cost based on a first relative speed between the first object and the ADV, wherein the first relative speed cost is determined based on a second cost function, and wherein according to the second cost function, a relative speed cost is equal to a first positive constant when a projected relative speed is below a first threshold, wherein the relative speed cost decreases as the projected relative speed increases when the projected relative speed is above the first threshold and below a second threshold, and is equal to zero when the projected relative speed is above the second threshold;

determining a first object cost associated with the first object based on a combination of the first distance cost and the first relative speed cost;

performing speed planning on a trajectory planned for the ADV based at least in part on the first distance cost and the first relative speed cost;

generating control signals to drive the AMV based on the planned trajectory; and driving the ADV based on the generated control signals.

8. The machine-readable medium of claim 7, wherein the first distance cost is determined based on a first cost function that is based on a reciprocal function.

9. The machine-readable medium of claim 8, wherein the first cost function maps a distance to a distance cost and is of the form: distance cost=1/(0.5* distance).

10. The machine-readable medium of claim 7, wherein the operations further comprise determining a first object cost associated with the first object based on a combination of the first distance cost and the first relative speed cost, wherein the speed planning is performed based on the first object cost.

11. The machine-readable medium of claim 10, wherein the first object cost is equal to a product of the first distance cost and the first relative speed cost.

12. The machine-readable medium of claim 7, wherein the projected relative speed is a signed variable, and wherein the projected relative speed is negative when the object is moving away from the ADV.

13. A data processing system, comprising:

a processor; and a memory coupled to the processor to store instructions, which when executed by the processor, cause the processor to perform operations, the operations including identifying a first object of one or more objects that have entered a buffer area predefined relative to an autonomous driving vehicle (ADV), wherein the buffer area is immediately in front of the ADV has a rectangular horizontal section with a predetermined length and shares a same width with the ADV, determining a first distance cost based on a first distance between the first object and the ADV, determining a first relative speed cost based on a first relative speed between the first object and the ADV, wherein the first relative speed cost is determined based on a second cost function, and wherein according to the second cost function, a relative speed cost is equal to a first positive constant when a projected relative speed is below a first threshold, wherein the relative speed cost decreases as the projected relative speed increases when the projected relative speed is above the first threshold and below a second threshold, and is equal to zero when the projected relative speed is above the second threshold, determining a first object cost associated with the first object based on a combination of the first distance cost and the first relative speed cost, performing speed planning on a trajectory planned for the ADV based at least in part on the first distance cost and the first relative speed cost, generating control signals to drive the ADV based on the planned trajectory and driving the ADV based on the generated control signals.

14. The system of claim 13, wherein the first distance cost is determined based on a first cost function that is based on a reciprocal function.

15. The system of claim 14, wherein the first cost function maps a distance to a distance cost and is of the form: distance cost=1/(0.5* distance).

16. The system of claim 13, wherein the operations further comprise determining a first object cost associated with the first object based on a combination of the first distance cost and the first relative speed cost, wherein the speed planning is performed based on the first object cost.

17. The system of claim 16, wherein the first object cost is equal to a product of the first distance cost and the first relative speed cost.

18. The system of claim 13, wherein the projected relative speed is a signed variable, and wherein the projected relative speed is negative when the object is moving away from the ADV.

* * * * *